(12) United States Patent
Srinivas et al.

(10) Patent No.: US 6,651,146 B1
(45) Date of Patent: Nov. 18, 2003

(54) METHOD AND APPARATUS FOR MANAGING ACCESS CONTENTION TO A LINEAR LIST WITHOUT THE USE OF LOCKS

(75) Inventors: Mysore Sathyanarayana Srinivas, Austin, TX (US); James William Vanfleet, Austin, TX (US); David Blair Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,810

(22) Filed: Feb. 24, 2000

(51) Int. Cl.[7] .............................................. G06F 12/00
(52) U.S. Cl. ......................... 711/150; 707/100; 707/8; 711/168
(58) Field of Search ................................ 707/100, 102, 707/100.8; 711/147, 150, 167, 168, 148

(56) References Cited

U.S. PATENT DOCUMENTS

| | | | | |
|---|---|---|---|---|
| 4,847,754 A | * | 7/1989 | Obermarck et al. | 709/104 |
| 5,319,778 A | * | 6/1994 | Catino | 707/102 |
| 5,471,593 A | * | 11/1995 | Branigin | 712/219 |
| 5,485,626 A | * | 1/1996 | Lawlor et al. | 709/314 |
| 5,553,305 A | * | 9/1996 | Gregor et al. | 709/106 |
| 5,966,547 A | * | 10/1999 | Hagan et al. | 710/57 |
| 6,178,473 B1 | * | 1/2001 | Bonola | 710/54 |
| 6,360,220 B1 | * | 3/2002 | Forin | 707/8 |
| 6,513,057 B1 | * | 1/2003 | McCrory | 709/102 |
| 2001/0047361 A1 | * | 11/2001 | Martin et al. | 707/103 R |

OTHER PUBLICATIONS

Maged M. Michael and Michael L. Scott, Simple, Fast, and Practical Non–Blocking and Blocking Concurrent Queue Algorithms, ACM 1996, pp. 269–275.*
Thomas E. Anderson, The performance of Spin Lock Alternatives for Shared–Memory Multiprocessors, IEEE 1990, Log No. 8931909.*
Maurice Herlihy and J. Eliot B. Moss, Transactional Memory: Architectural Support for Lock–Free Data Structures, IEEE 1993, pp. 289–300.*
John D. Valois, Lock–Free Linked Lists Using Compare–and–Swap, ACM 1995, pp. 214–222.*

* cited by examiner

*Primary Examiner*—Jean R. Homere
*Assistant Examiner*—Leslie Wong
(74) *Attorney, Agent, or Firm*—Richard F. Frankeny; Winstead Sechrest & Minick P.C.; Thomas E. Tyson

(57) ABSTRACT

The present invention discloses a method of managing lists in a multiprocessor system without the use of locks that prevent contention for the list. List management in a linear list with a front and a back of the list has applications where it is desirable to manage the list in a Last In First Out (LIFO) and a First In First Out (FIFO) or a combination of LIFO and FIFO. LIFO and FIFO list management can be done by restrictively adding data elements to the front, back and removing data elements from the front of a managed list. At certain times there can be contention for a list and either locking routines are in place to prevent contention or some other method is used to guarantee data element integrity. The present invention discloses a set of operations that when used with certain protocols allow two or more processors to access a list as a LIFO or FIFO in a multiprocessor system without the use of locks.

20 Claims, 8 Drawing Sheets

METHOD AND APPARATUS FOR MANAGING ACCESS CONTENTION TO A LINEAR LIST WITHOUT THE USE OF LOCKS

TECHNICAL FIELD

The present invention relates, in general, to data processing systems and in particular to the management of lists within a multiprocessor environment.

BACKGROUND INFORMATION

Many data processing systems employ multiple processors for the central processing unit (CPU). These multiple processors may have both dedicated and shared memory resources where data is stored. Shared memory resources are resources where all of the multiple processors may store data which may be read or modified by any of the processors. Since shared memory may be modified by a particular processor and then read or used by another, protocols and methods have been developed to ensure that a particular processor can access the status of particular data.

A data element may have information that defines a block of memory that may contain data accessible by any one of a multiplicity of processors. The actual data within the block of system memory may define the data type (ex. characters, integers, floating point and etc.) and how the information is interpreted. To manage data flow in a computer system, blocks of memory may be managed with addresses defining the block of memory without regard to the actual resident data. A data element comprising a variable, definable location address in a system manager, the beginning address and size of a block of system memory, and pointer addresses (e.g., pointers and next pointers) used to link the data element with other data elements, may be used to manage information in a multiprocessor system. A linked set of data elements is referred to as a list. A list is a collection of data elements that are connected together by pointer addresses that determine how the list is accessed.

A processor may inquire as to the status of the data in a block of system memory referenced by a data element or, alternately, whether the block of system memory referenced by the data element is free to be used by the processor. In this context, a processor may require the use of a storage space referenced by the data element. Memory resource management is one process that may be managed using groups of data elements defining blocks of free memory for use by multiple processors.

A singly linked list is one where the pointer addresses cause the list to be navigated in one direction. A linear list is one where the data elements are linked in a chain of single data elements. The linkages of the linear list comprise the pointer addresses that are loaded by the list managing processes which may be referred to as a list manager.

A data element within a list may have a list address, a data set, and a next pointer. When a data element is assigned to a particular list, it is assigned a list address that defines where it resides in memory containing the list. A data element's list address is referred to as its pointer address or simply its pointer. A data element pointer address is how it is located. The data set of a data element may include a definition of what is being managed and possible information further defining the particular data set. A processor accessing a data element from a list would interpret the data set within the data element. An example of a data set within a data element could be the definition of a block of memory (e.g., the size and starting address of a block of memory). However, artisans of ordinary skill would recognize that the principles of the present invention may by used with any singly liked list independent of the contents of the data set. A data element's next pointer address is the list address linking it to, or pointing to, the next data element in a particular linkage of the list. Linkages of data elements may be realized by, defining a beginning data element, having the beginning data element point to a next data element and finally defining which data element is the last data element. A last data element in a list may be defined by having a data element's next pointer point to a NULL address. A NULL address is one that by convention is indefinite within the list and may signal the list management process that the element is the last data element in the list.

A list, in an embodiment of the present invention, has a header with pointers to the first data element and the last data element in a particular linkage of the list. If the header, or simply the head of a list, points to the pointer (list address) of the first data element in a linkage and the first data element has a next pointer that points to the next element in a linkage and the header also points to the last data element of a list whose next pointer points to a NULL or zero, the list may be considered complete. A NULL in a next pointer may be indicated by placing all zeros in the next pointer and means pointing to no address. A list may have zero or one or more data elements. A list with zero elements would have the first and last pointer in the list head equal to NULL.

The data elements in a list may be manipulated; new data elements may be added, data elements may be removed and data elements may possibly be modified in other ways. However, management of lists within a symmetric multiprocessor system (SMP) where each processor manages its own memory resources may present problems. Since access to a list in an SMP may be requested by any of the multiple processors there is a need to manage the list contention. Contention for a list usually is done with the use of locks that block access of one or more of the contending processors for the list. If one of the processors has access to the list, a mechanism to prevent concurrent access by another processor is typically employed.

If a multiprocessor system with shared memory resources uses a locking protocol to prevent access, the following sequence may be typical:

A processor X requests access to particular List A. Granting access would activate a locking subroutine that locks List A and notifies or indicates to other processors that the list is locked. When processor X releases or unlocks the List A, it does so with an unlocking routine and another processor Y can then access the released list. The locking and unlocking routines may each be ten or more machine instructions long.

In high speed multiprocessor systems there are many times when conflicts between processors for a particular list may occur, however, a protocol that uses locks for list management requires the locking and unlocking routines to be run any time the list is accessed and released whether or not contention occurs. Running the lock and unlock routines may slow many operations in such a multiprocessor system.

An alternate to locking is needed that can deal with contention in list management and does not consume important system time or cycles unless a contention actually occurs.

SUMMARY OF THE INVENTION

The present invention discloses a method of managing a list of data elements in a multiprocessor system without the use of locks. Locks are routines that may be invoked expressly to prevent contention problems when more than one processor accesses a list. An embodiment of the present invention manages lists in a "last in first out" (LIFO) or a "first in first out" (FIFO) protocol by using a set of operations which add data elements to the front or back of a list and remove data elements from the front of a list. Implementing these functions to manage a list also employs an operation that is atomic in the software sense. An atomic operation or instruction does several things immediately without the possibility of being partially done or having another instruction interspersed. An atomic operation of "compare and swap" (CAS) is used in the present invention implementing the functions used to manage a list The present invention provides improved performance for multiprocessor computer systems by implementing singly linked lists where the atomic operation of CAS is used to implement functions used to manage the list without the use of locks.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
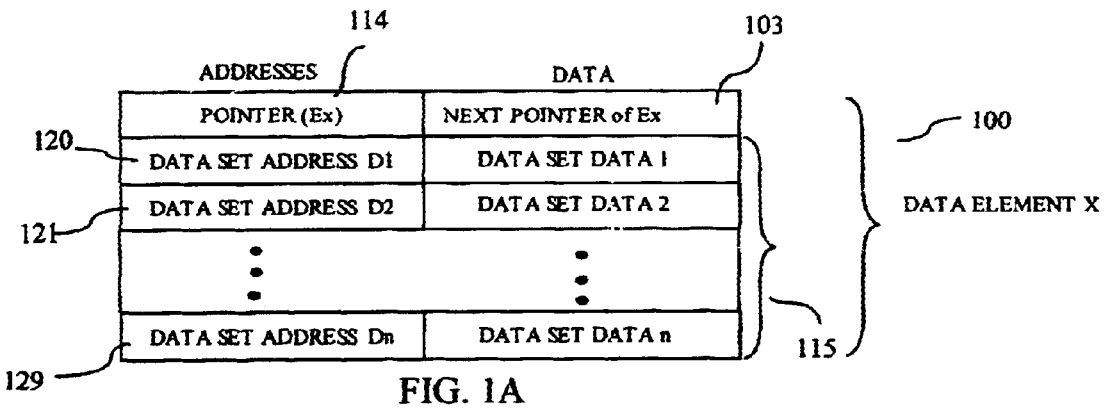
FIG. 1A illustrates the structure of a data element.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

In an SMP environment multiple processors have shared memory resources and each processor manages its own memory resources. A list contained within shared memory describes a group of data elements that are, in general, connected or linked together in a prescribed fashion. Lists, in an SNP environment, may be accessed by one or more processors during operation.

The method of the present invention uses an atomic operation of "compare and swap" (CAS), details which are explained later, to implement functions used in list management. In a software or programming context an operation or instruction is atomic if it performs one or more operations immediately with no chance that they are partially done or that another instruction is interspersed. In particular, the present invention implements list management which allows data elements to be added to the front or back of the list as well as allowing removal or data elements from the front of the list using an atomic operation of CAS in place of locks. These operations allow list management using a protocol of either a last in first out (LIFO), a first in first out (FIFO), or a combination of LIFO and FIFO without the use of locks.

Refer now to the drawings wherein depicted data elements are not necessarily shown to scale and wherein like or similar data elements are designated by the same reference numeral through the several views.

FIG. 1A illustrates a data element 100 (X) in a list in one embodiment of the present invention. The structure of the data element illustrated by FIG. 1A has two parts, the addresses that define where the data of the data element is stored and the data stored at the addresses. In the present invention, a data element 100, has stored in a pointer address 114 data of the data element 100. The pointer address 114 is represented by (Ex). If the pointer address 114 is accessed, data which in this case is the next pointer 103 of data element 100, would be returned. Following the pointer address 114 would be addresses of the data set 115 of data element 100, represented by data set address D1 120 and D2 121. An actual data set of a data element may include a plurality of addresses, D1 120 through Dn 129. The data set 115 is assigned the pointer 114 (e.g., Ex) when it is added to a list of the present invention. The next pointer 103 is a variable address that is also assigned to the data element 100 depending on how the data element 100 is to be linked within in the list. While pointers within a list are specific fixed addresses of the list, the next pointers assigned to those pointer addresses vary depending on how the lists assembled. Data elements, as added to a list, are assigned available pointer addresses and then linked together with assignable next pointers.

Figure 1B:
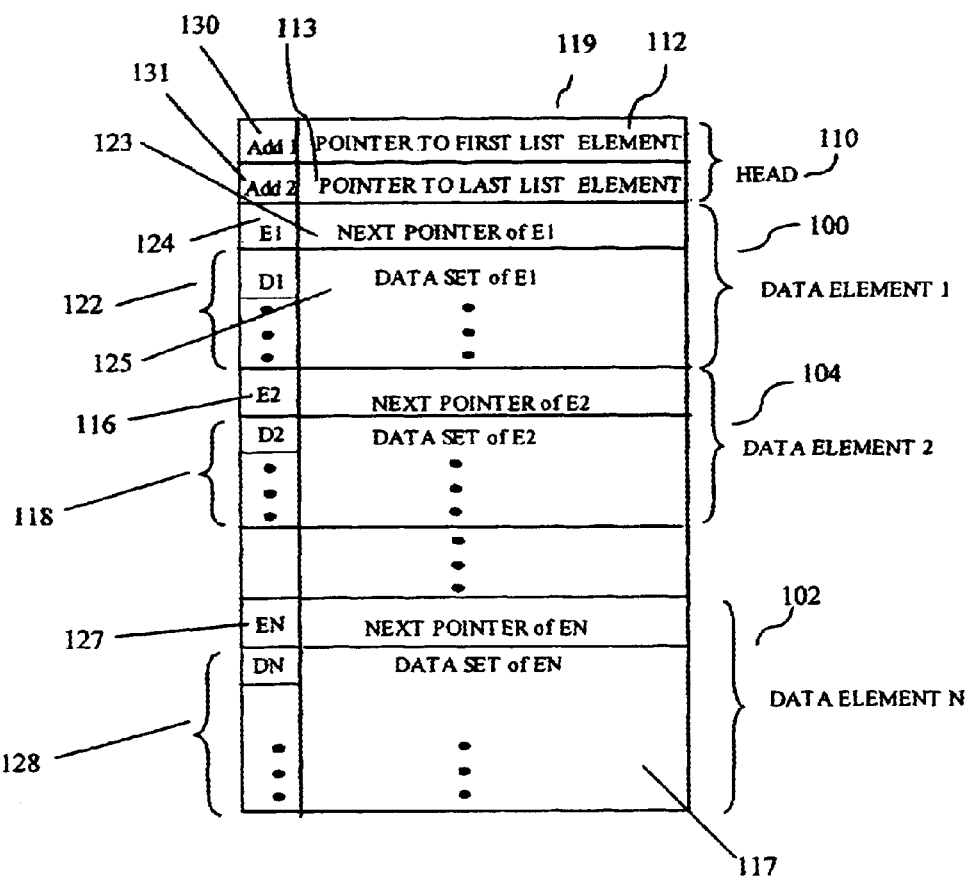
FIG. 1B is an illustration of a list.

FIG. 1B illustrates a list of data elements 1 through N. The list in FIG. 1B also has a header or head 110. The head of a list is two addresses at the beginning of the list where data in the form of pointer addresses is stored. The addresses of the head 110 are illustrated by Add 1 130 and Add 2 131. The pointer address 112 (pointer of the first data element) is stored in the list location defined by Add 1 130 and the pointer address 113 (pointer of the last data element) is stored in Add 2 131. Following the head 110 is data element 1 100, data element 2 104, and finally data element N 102. Each of the data elements in the list illustrated in FIG. 2B has a pointer, a next pointer and a data set. For example, data element 1 100 has pointer 124 (E1) next pointer 123, and data set 125. The addresses of the data set 125 are represented by addresses 122.

The data set of a data element, in general, may contain any type of data. In managing a list it is not necessary for the list manager to interpret the data set, management of data elements is done primarily by using the pointers of data elements. In illustrations of the list management method of the present invention it is typically unnecessary to show explicitly the data set of a data element. In some of the drawings illustrating the present invention, a short hand method is employed for simplicity representing a data element as a two-section box containing the next pointer (top section) and the pointer (bottom section) of the data element.

Figures 2A, 2B, 2C:
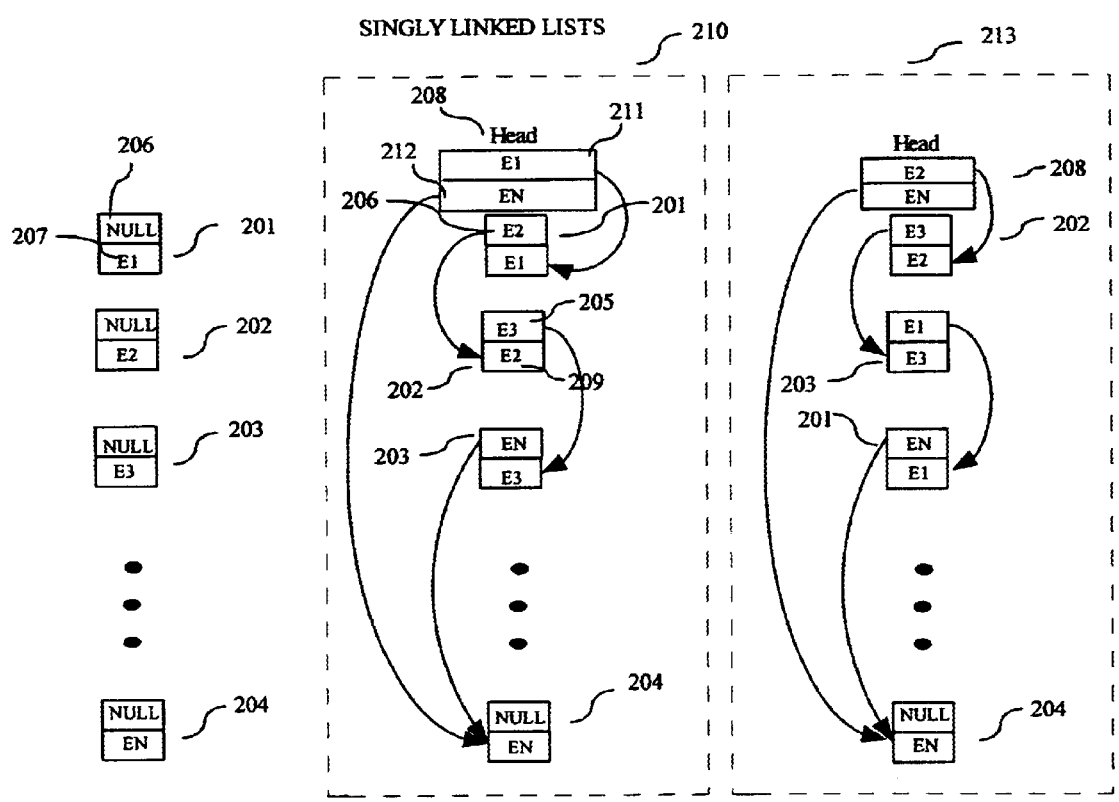
FIG. 2A is a representation of N data elements un-linked.
FIG. 2B is one embodiment of the present invention illustrating a linkage of N data elements.
FIG. 2C is another embodiment of the present invention illustrating another linkage of the N data elements of FIG. 2B.

FIG. 2A uses the representation of a data element discussed above. A set of data elements 201, 202, 203 through 204 are illustrated. This set of data elements is not linked since each data element has a next pointer equal to NULL. Data element 201, for example, has a pointer 207 equal to E1 and a next pointer 206 equal to NULL.

FIG. 2B is a representation of a list 210 that has been created by defining a head 208 and linking the data elements 201, 202, 203 and 204. The head 208 has a first pointer 211 equal to E1 and a last pointer 212 equal too EN. The next pointer 206 of data element 201 is equal to E2, the next pointer 205 of data element 202 is equal to E3 and next pointer of data element 204 is NULL indicating that it is the last data element of list 210.

FIG. 2C is another linkage defining a list 213. The data elements 202, 203, 201 and 204 are represented as the same as those in FIG. 2B in that they have the same pointers, however, the data elements have different next pointers and thus the linkage is different. One could argue that list 210 and list 213 are not different as they appear to have the same data elements albeit arranged in a different order. Nevertheless, one would find that in general the pointer addresses represented by E1, E2, E3, and EN would be referencing different data sets and thus the lists could be different.

While a data set may contain any type of data, in one application of the present invention, a data element may have a data set defining a block of memory. This data set would contain a beginning address and a size of the block of memory in system memory. Data may be stored in the block of memory defined by the beginning address and the size. It is not required that the data element, in a list, contain the actual data that may be contained in the block of system memory. If a processor requires a data element in a list, it actually requires the information defined by the data set in the data element. A list manager routine would be used to manage access to that data element. The processor would eventually load the data stored in the system memory defined by the storage location contained in the data set of the data element and subsequently operate on this data in a manner depending on a particular application.

Embodiments of the present invention employ primitive operations of system programming to implement the functions used in the management of a list. These primitive operations are applied in a novel way to the management of lists. The functions, to be explained later, are implemented in embodiments of the present invention and make use of particular primitive operations including an atomic operation of "compare and swap" (CAS) to allow list management without the use of locks. In general an atomic CAS is hardware enabled in a given SMP system.

List managers are software routines that can vary depending on the types of lists managed and the defined management process. In one embodiment of the present invention a list is managed primarily with operations employed to add elements to and remove elements from a list. In particular, embodiments of the present invention employ the following functions; "add a data element to the front of a list" (ATLF), "add an element to the back of a list" (ATLB) and "remove a data element from the front of a list" (RFLF), each function implemented using an atomic operation of a CAS. The list management functions are implemented with other primitive operations and an atomic CAS and as disclosed enable management of a list of the present invention in an SMP system without the use of locks. In one embodiment of the present invention, the use of the disclosed functions of an ATLF, an ATLB and an RFLF, on a singly linked list of free memory data elements, allows improved memory/cache management in an SMP system.

Figure 3:
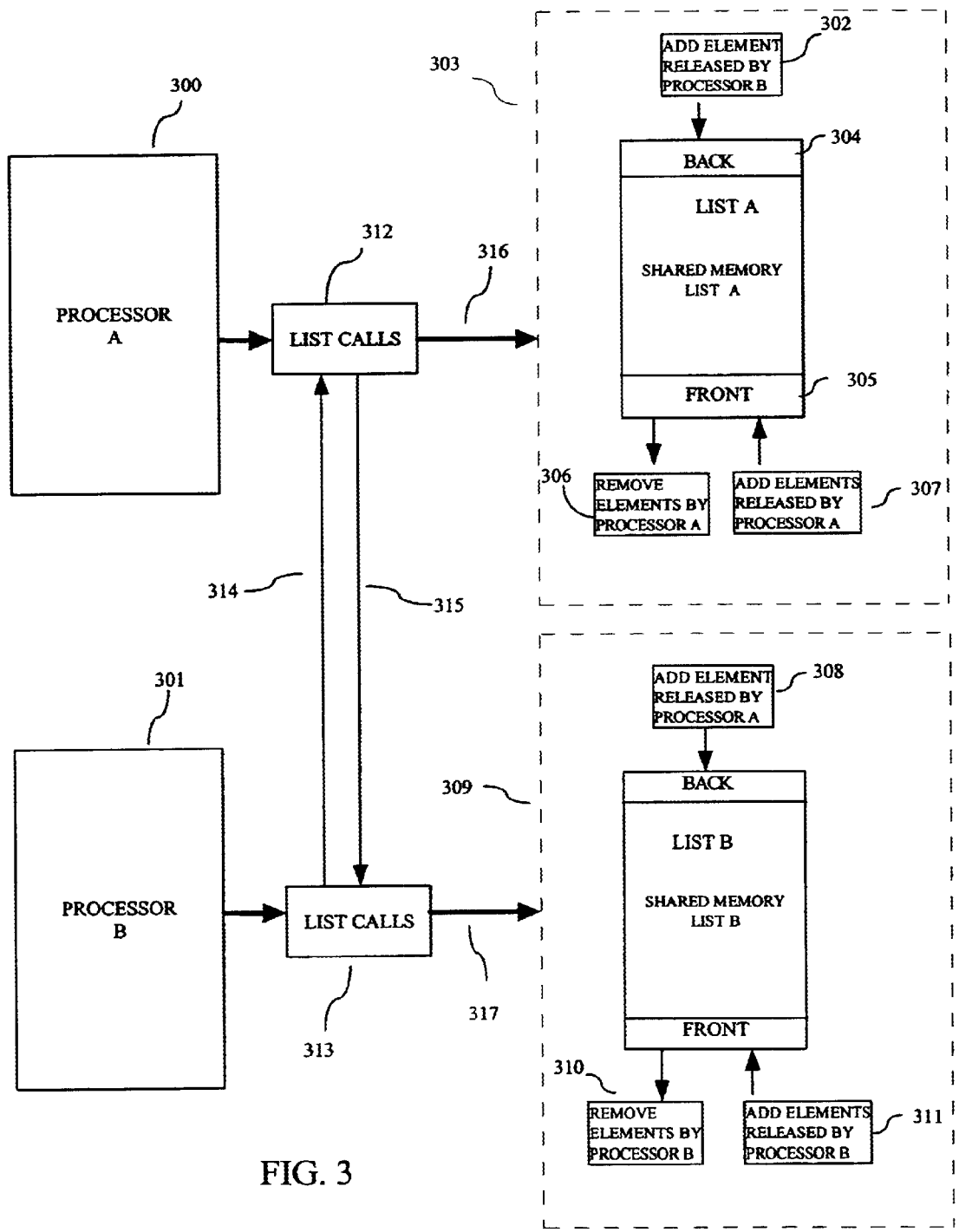
FIG. 3 is a block diagram illustrating two processors with two managed lists.

FIG. 3 is a block diagram illustrating two processors, processor A 300 and processor B 301 accessing data elements from two different lists, list A 303 and list B 309. List A 303 and list B 309 reside in shared memory and as such are accessible by either processor A 300 or processor B 301. In one embodiment of the present invention list A 303 and list B 309 are lists of free memory available for use by either processor A 300, processor B 301 or possibly other processors if the SMP system has more than two processors. In the embodiment of the present invention illustrated in FIG. 3, list A 303 is a list of those free data elements used primarily by processor A 300 and list B 309 is a list of those free data elements used primarily by processor B 301. Processor A 300 would issue list calls, represented by 312, to access list A 303. Arrow 316 is used to illustrate that processor A 300 primarily accesses list A and arrow 315 illustrates that while processor A may access list B 309 it may do so infrequently. In the same way processor B 301 primarily accesses list B with calls represented by 313 and arrow 317 in the same fashion as 312 represents accesses to list A by processor A. Arrow 314 also indicates an infrequent path of access from processor B 301 to list A 303. The protocol described does not have to be strictly enforced but is one that would result in more efficient operation when the list is one of free data elements in an SMP system. Also illustrated in FIG. 3 is an additional protocol in managing a list of free data elements in an SMP system. Processor A 300, when accessing list A, adds or removes elements from the front of the list. List A 303 and list B 309 are linear, singly linked lists and as such have a front (the first data element) and a back (the last data element) as previously discussed in conjunction with FIG. 2B and 2C. Therefore, when Processor A returns or removes a data element from an exemplary list A 303, it removes the first data element in the list or it adds an element before an existing first data element in the list. Likewise, by protocol, when processor B is returning a data element to list A 303 it adds the data element to the back of the list. Processor B 301 accesses data elements from list B 309 and list A 303 in a like manner.

Processor A 300 and processor B 301 preferably use list A 303 and list B 309 respectively for access to free memory elements unless its preferred list has no elements. If a processor has no elements in its primary list it may request an element from the primary list of another processor. If a data element previously accessed from the list of another processor subsequently becomes free, it is returned to the list of the processor from which it was accessed. In embodiments of the present invention, when using this protocol, two lists will not contain the same data element and a contention arising from the same data element in two different lists does not occur. In general, the list management in embodiments of the present invention can be used with more than two processors.

In memory management, it is usually desirable to minimize time necessary to access a memory element. In an SMP system, it is desirable to have each processor manages its own list of free memory elements in a way to minimize access time to memory elements. In one embodiment of the present invention processor A 300, for example, adds data elements at the front and removes data elements from the front of the list A 303. This results in an LIFO access of list A 303 data elements accessed by processor A 300. Also processor B 301, if returning a data element previously accessed from list A 303, by protocol, preferable adds data elements to the back of list A 303. Using this particular method of list management results in an FIFO access of list A 303 data elements that have been released by processor A 300. Using LIFO, processor A 300 will most likely find data elements that it last accessed in its cache when it again requests a memory element, which may result in faster operation. Those data elements 302, which have been released by processor B 301, are accessed by processor A 300 later as FIFO and therefore there is additional time for a data element returned by processor B 301 to have also returned from its cache memory. Processor B 301 manages its list B 309 in the same manner as would additional processors if the SMP system contained more than two processors.

As previously described, there may be times when processor A 300 and processor B 301 will concurrently access list A 303 while getting or returning data elements. Because contention between the two processors would occur, a method or protocol needs to be in place to deal with this occurrence. Previously list management was done with locks to handle possible contention. In a particular embodiment of the present invention, where the list comprises data elements defining free memory, a list managed using locks would be locked anytime an exemplary processor A 300, for example, accessed list A 303 and unlocked when it was not accessing the list A 303. Since list A 303 is primarily used by processor A 300, the lock and unlock routine would be executed many times for the few contentions that may occur between processor A 300 and processor B 301. The wasted time in running the unnecessary lock an unlock routines may lead to inefficient system operation.

The present invention uses an atomic operation of CAS in place of locking when a list is managed. Managing a list of free memory data elements using the functions of ATLF, ATLB, RFLF, and using CAS in implementing these functions handles contention without locks and may result in faster operation.

The method of the present invention will be explained by detailing the implementation of the functions ATLF, ATLB, RFLF using the atomic CAS operation and finally showing how contention for access to a list by two or more processors is handled using the disclosed functions to add and remove data elements.

Figure 7:
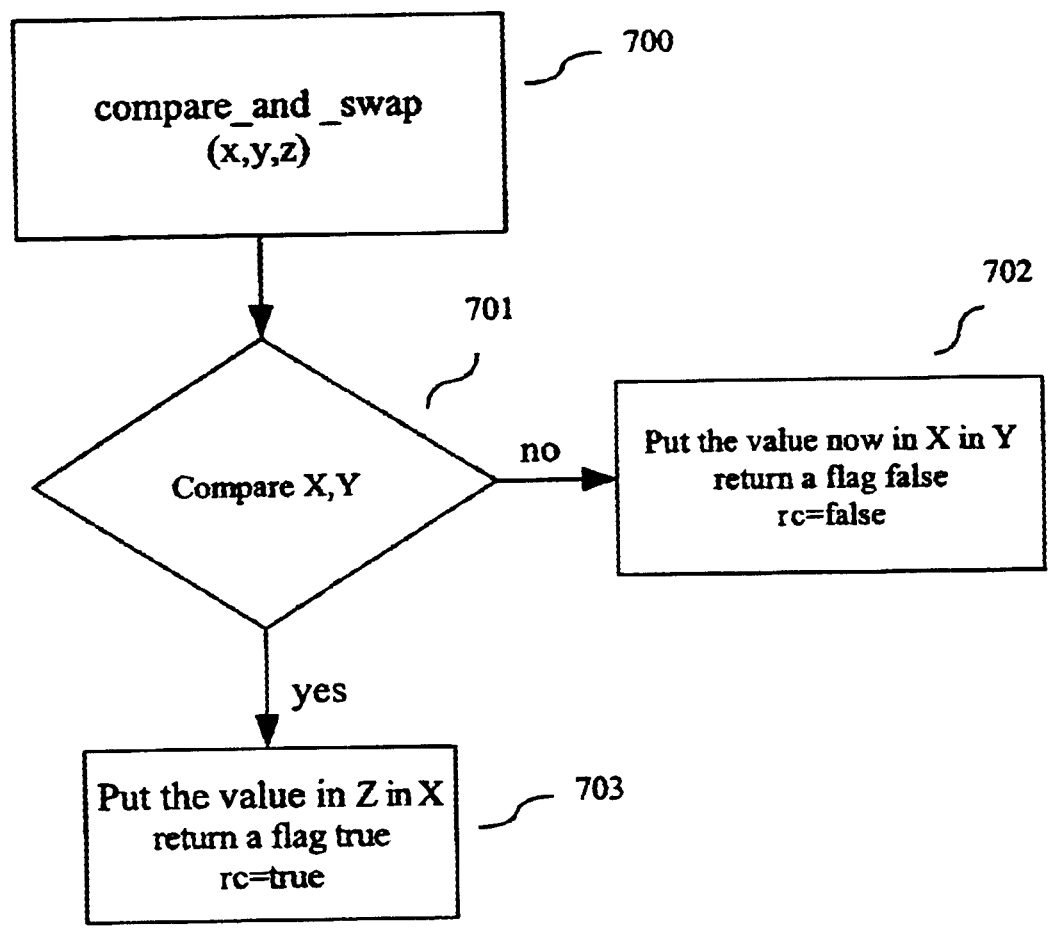
FIG. 7 is a flow diagram of a methodology to do an atomic operation of compare and swap with arguments X, Y and Z in one embodiment of the present invention.

FIG. 7 is a flow diagram of the atomic CAS operation on three variables or arguments. In FIG. 7, the three arguments illustrated are X, Y, and Z. The CAS operation tests to see if X is equal to Y. The CAS operation is called with step 700 and X is compared to Y in step 701. If X is not equal to Y, step 702 interchanges X and Y and returns a flag "rc"=false. If in step 701 X is equal to Y, the step 703 sets X=Z and returns a flag "rc"=true. The CAS operation is atomic because the variables X, Y, Z are not free to be used by other functions calling a CAS with the same variables until the CAS is complete.

CAS, as an atomic operation, is invoked with different arguments in the functions ATLB, ATLF and RFLF. The CAS operation, when shown in exemplary illustrations of the functions, will execute as shown in step 700 using appropriate arguments. A CAS, in embodiments of the present invention, will be used in all of the defined functions and will be shown to enable list management of adding and removing data elements by more than one processor without the use of locks.

The following is a description of the list management functions of the present invention. The functions are each described with a flow diagram and an example, where appropriate, of one or more processors calling a function concurrently where a CAS operation is used to handle contention without locks.

1. Adding Data Elements to the Front of a List (ATLF)

One of the necessary functions of a list manager is to add data elements to a list. In an embodiment of the present invention, where a list comprises free memory elements available to an SMP system, a list manager (e.g., the one in FIG. 3), would load list A 303 with all the free memory elements that will be primarily accessed by processor A 300.

After a list is initialized, it is NULL (there are no data elements in the list) and the first operation by a list manager, acting on an initialized list, would be to add data elements to the resultant empty list. An ATLF, in the present invention, has an associated protocol that is explained in the following:

An ATLF is used when a list is empty and the first pointer and last pointer in the head of a list both are NULL even if an ATLB is called.

Figure 6:
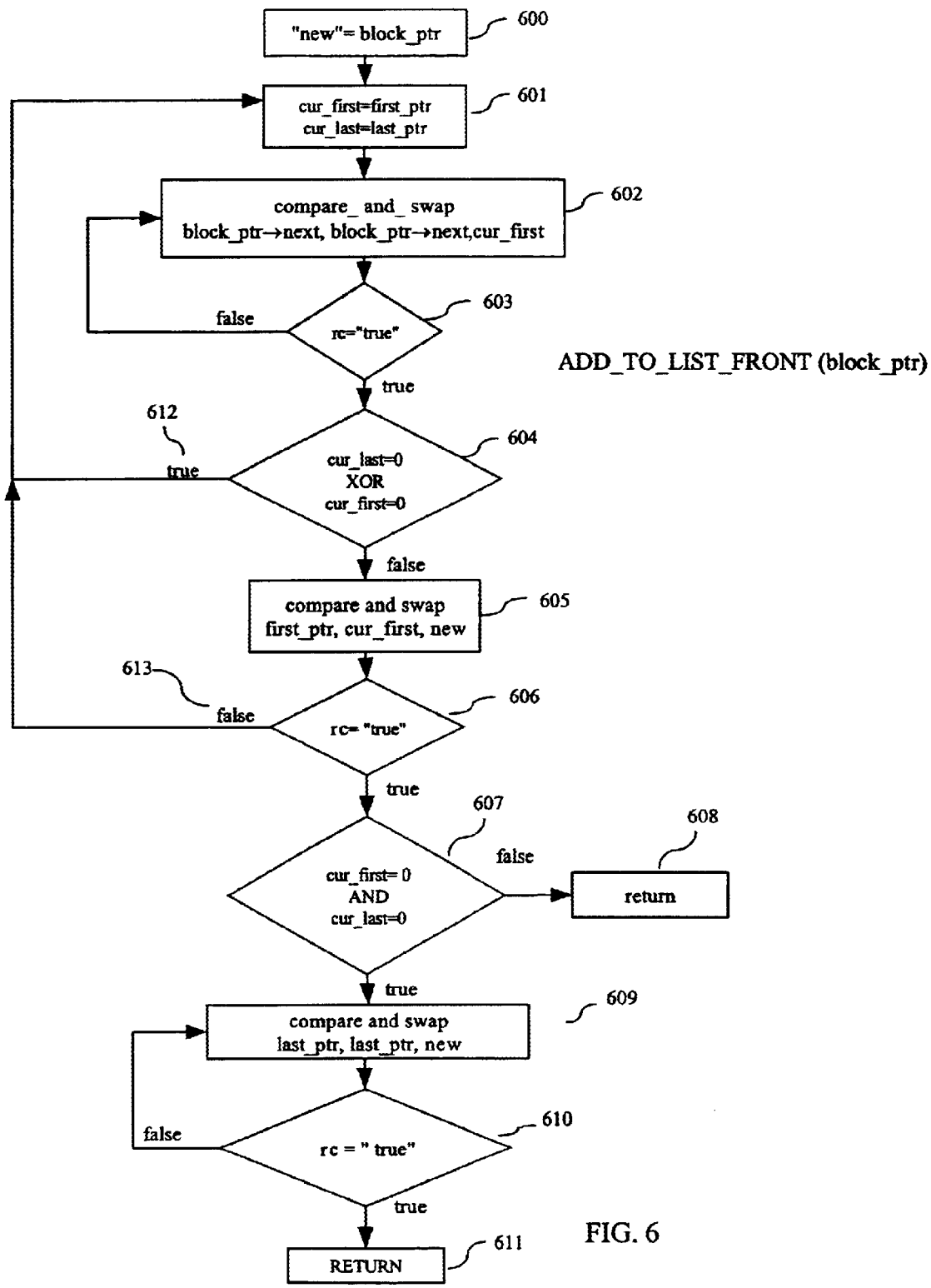
FIG. 6 is a flow diagram of the steps to add a data element to the front of a list in one embodiment of the present invention.

FIG. 6 is a flow diagram of the functions and operations used to implement the ATLF function of the present invention. The variables referred to in this and other flow diagrams will be explained first.

(a) "new" is a variable name used in the implementation of an ATLF (b) "block_ptr" is the name of the pointer assigned to each data element to be added to a list and is a local variable to a particular processor invoking a function to add a data element (c) "cur_first" is a variable name used to define a saved first list pointer (sometimes called just first pointer). There is one "cur_first" for a list being managed.

(d) "cur_last" is a variable used to define a saved last list pointer (sometimes called just last pointer). There is one "cur_last" for a list being managed.

(e) "first_ptr" is the first list pointer (first pointer)and "last_ptr" is the last list pointer (last pointer).

(f) "rc" represents a flag or returned condition which is either true or false.

(g) "block_ptr→next" means the next pointer of the data element with the pointer equal to block_ptr. This syntax is used with variables other than "block_ptr" with a similar meaning.

An ATLF, in accordance with the principles of the present invention, is shown in the flow diagram in FIG. 6. An ATLF is invoked with the variable block_ptr which is a local variable to the processor invoking the ATLF. When adding a data element to the front of a list, the list could either be empty or have one or more data elements. In step 600 the data element to be added is assigned a pointer represented as "block_ptr" and a variable called "new" is set equal to the variable block_ptr. In step 601, the list's first_ptr and last_ptr are saved as cur_first and cur_last. Adding a data element to the front of a list requires placing the data element to be added in front of a present first data element. Step 603 invokes the atomic CAS with arguments "block_ptr→ next", "block_ptr→ next", "cur_first" (X, Y, and Z respectively in the illustration of FIG. 7). The CAS operation compares the first two arguments which, in FIG. 6 step 603, are the same. Referring to FIG. 7, if the first two arguments compare, step 703 will be executed. Therefore, in step 602, the next pointer of the data element with the pointer equal to block_ptr (the data element to be added) is set equal to cur_first (the saved first pointer or the pointer to the current first data element) and the flag "rc" is returned as true. As a result of step 602, the data element to be added has as its next pointer points to the old first data element (i.e., the added data element has been placed in front of the previous first data element). Step 603 tests the returned flag "rc" for true or false. Step 604 determines the exclusive OR (XOR) of the NULL condition of cur_first and cur_last (one but not both are equal to NULL). If step 604 is true, another operation is in process and "a wait" occurs via path 612. In step 604, if cur_first equals NULL, there is no first data element, the list has been made empty by removing a data element from a single element list (see RFLF in FIG. 4). In this case an RFLF function (see FIG. 4) would also set last_ptr equal to NULL. In step 604, if cur_last is not also equal to NULL, a RFLF is not entirely complete or another function may be executing (again see FIG. 4). If there is no contention, step 604 proceeds to step 605 which invokes a CAS (first_ptr, cur_first, new). In the CAS operation of step 605, the first two arguments compare and the first_ptr will be set equal to the block ptr (the first list pointer now points to the added data element as the new first data element). Step 606 tests the returned flag "rc" from the CAS of step 605, the flag will be true unless there is contention which is discussed later. A false flag "rc" in step 606 results in a branch 613 to save the first_ptr and last_ptr. The addition of the data element to the front of the list is complete.

Step 607 is a test to see if both the cur_first and the cur_last are equal to zero. As stated earlier, the last_ptr does not normally change when a data element is added to the front of a list, however if the list was an empty list the last_ptr also has to change. Step 609 does a CAS (last_ptr, last_ptr, new) if the data element is being added to is an empty list. The first two arguments compare and the last_ptr is made equal to "new" (block_ptr) which makes the first and last pointer equal. The list which was empty now has one data element. The test in step of returned flag "rc" indicates that the CAS is complete and a true invokes step 611 or a return for another operation.

In an ATLF, contention could result if two or more processors tried to invoke an ATLF concurrently. For list management in embodiments of the present invention, concurrent ATLF calls to the same list by two processors may be infrequent but is not explicitly prevented. A review of the function ATLF, in FIG. 6, will demonstrate how ATLF contention is handled with an atomic CAS.

When the CAS in step 602 has started as a result of a first processor invoking an ATLF it should run to completion without interference. If after execution of the CAS in step 602 by a first processor, a second processor begins an ATLF on the same list, the second processor will save the same first_ptr and last_ptr as the first processors ATLF. When the first processor's ATLF does the CAS in step 605, it will replace the first _ptr with "new". The second processor's ATLF has already saved the first_ptr and last_ptr before the first_ptr was updated in step 605 by the first processor's ATLF. Now the CAS, executed by the second processor's ATLF in step 605, will not have a compare of first_ptr and cur_ptr and it will take path 615 because the CAS will return "rc"="false" (see step 702, FIG. 7). The second processor's ATLF will therefore go to step 601 and again save the first_ptr and last_ptr ( this time correctly), and the second processor's ATLF will then be able to successfully add an element to the front of the list. The contention between two processors, while invoking concurrent ATLF functions on the same list, was accomplished using the atomic CAS and the defined ATLF function. The ATLF list management contention between two processors did not require locks.

2. Adding a Data Element to the Back of a List (ATLB)

In the present invention, when an ATLB call is made, the list manager checks to see if the list is empty. By convention, since an empty list has no beginning or end, the list manager will call an ATLF instead of executing an ATLB.

No new terms are added in defining the function ATLF. The list manager in embodiments of the present invention will employ the protocol listed below:

The next pointer of the added data element always begins as NULL. Since the data element added will be the last data element its next pointer remains NULL.

Figure 5:
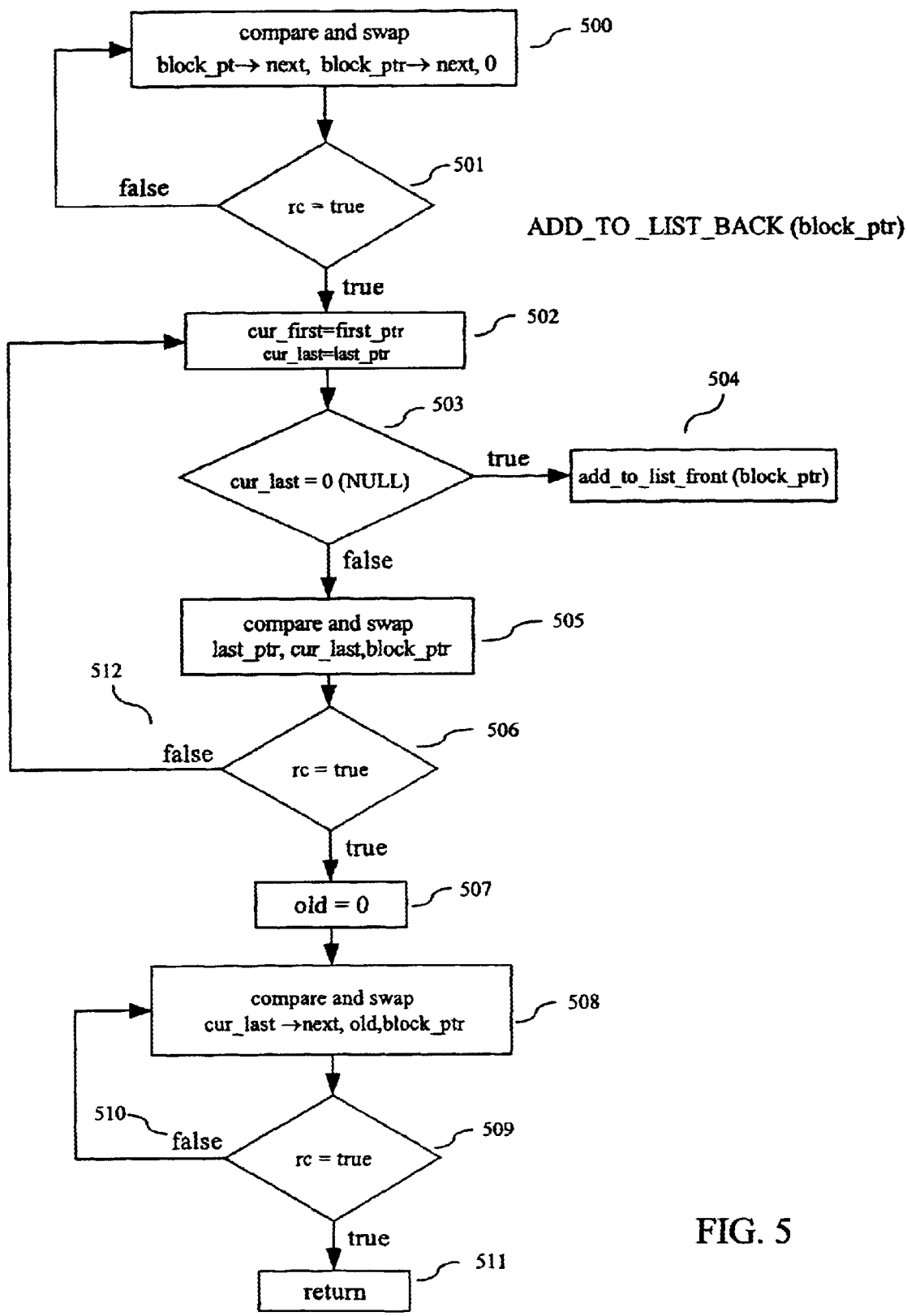
FIG. 5 is a flow diagram of a methodology to add a data element to the back of a list in one embodiment of the present invention.

The flow diagram used to explain an ATLB is shown in FIG. 5. An ATLB is a function which is invoked with the parameter "block_ptr". If an ATLB is invoked with a first block_ptr and another ATLB with a second block_ptr is invoked on the same list, the two ATLBs run concurrently with different values of the parameter, block_ptr.

In step 500, a CAS (block_ptr→ next, block_ptr→ next, NULL), is invoked to atomically set the next pointer of the data element with its pointer equal to block_ptr to NULL. Since the data element to be added is always assigned a pointer (equal the variable block_ptr), the CAS in step 500 sets the added data element's next pointer equal to NUTLL. The condition of the returned flag "rc" is tested in step 501. Step 500 makes the added data element have a next pointer consistent with a last element of a list. In step 502, the first pointer and last pointer of the list are saved as "cur first" and "cur last", respectively, before the list is modified. Step 503 tests if cur_first is equal to NULL (empty list), which if true, then step 504 will invoke an ATLF. If the list is not empty (step 503 returns a false), step 505 invokes a CAS (last_ptr, cur_last, block_ptr) with a branch on the condition of the returned flag "rc" in step 506. In the CAS in step 505, last_ptr and cur_last will compare and the last_ptr will be set to the block_ptr and a flag "rc" is true when tested in step 506. In step 507, the variable "old" used as a value in a CAS operation, is set to zero. Through step 507, the added data element's next pointer has been set to NULL and the last pointer in the head has been set to the pointer of the added data element. The remaining operation required when adding a data element to the back of a list is to make the next pointer of the previous last data element point to the new last data element.

Step 508 invokes a CAS (cur_last→ next, old, block_ptr) to complete the addition of the data element. Since a data element is being added to the back of a list, the next pointer of the previous last element is NULL unless the cur_last has been changed since starting an ATLB. "Cur_last→ next" and "old" compare while invoking the CAS of step 508 and the next pointer of the previous last data element (cur_last) is set to the block_ptr. The "rc" flag will be true and a return is invoked in step 511. The false condition in step 509 will be discussed later. The next pointer of the previous last data element now points to the added data element (new last data element) and the ATLB is completed.

When two or more processors attempt to concurrently invoke an ATLB on the same list, they invoke the steps in FIG. 5 in parallel. Only those variables that define characteristics of the list are subject to contention. The list in contention has only one head with a first and a last pointer. At any particular time a list may have only one first data element and one last data element. When two or more processors are concurrently adding elements to a list what is important is that all of the elements get added successfully. The following will explain what happens when two processors access the same list by invoking parallel ATLB functions.

If a first processor invokes an ATLB to add a data element (e.g., designated E2) on an exemplary list A (comprising one data element designated E1), the added data element E2 is assigned a pointer (e.g., first block_ptr). A block_ptr is not a shared variable and would be unique to an exemplary data element E2 while the first processors ATLB is executing steps in FIG. 5. If, concurrently, a second processor invokes on list A an ATLB to add a data element (e.g., designated E3) with a block_ptr (e.g., second block_ptr), no contention arises until after step 505. As the first processor's ATLB invokes the CAS in 505, a second processor's ATLB is either before or after step 502. If the second processor's ATLB is before step 502, then step 505 (for the first processor's ATLB) will complete (atomic CAS) and the first processor's ATLB will change the last_ptr before the second processor's ATLB does step 502. In this sequence, the first processor's ATLB has already saved the first and last pointers and in step 505 the first processor's ATLB changes the last pointer to equal its block_ptr (the pointer of the data element the first processor is adding). Since the first processor's ATLB is performing an atomic operation in step 505, the second processor cannot use the shared variable cur_last until the first processor's ATLB finishes the CAS in step 505. In step 505 the first processor's ATLB makes the last _ptr equal to its block ptr (the data element the first processor is adding to the back of the list). As the second processor's ATLB invokes step 502, it will save, as its cur_last, the pointer of the data element E2 that the first processor is adding to the back of the list. Step 505, invoked by the first processor's ATLB, will return a flag "rc" as true and the first processor's ATLB will set the variable "old" equal to NULL and proceed to step 508. The other branch 512 (false) in step 506 will be discussed later. In step 508 the first processors ATLB executes a CAS that sets the next pointer of the current last data element (the data element prior to adding E2) equal to the first block_ptr (pointer of data element E2).

When the second processor's ATLB invokes step 505, it will change the last_prt to its block_ptr (the pointer of the data element E3 that it is adding). When the second processor's ATLB gets to step 508, the data element just added by the first processor's ATLB, is the current last data element indicated by the last pointer saved by the second processor's ATLB. The second processor's ATLB will then change the next pointer of the data element E2 (added by the first processor's ATLB) to the pointer of the data element E3 (the data element the second processor is adding) and a concurrent addition of data elements to exemplary list A completes.

If, however, the second processor's ATLB has already saved the first and last pointers in step 502 before the first processor's ATLB has executed step 505, then both invoked ATLB functions have saved the same cur_first and cur_ last. After the first processor's ATLB completes step 505 and changes the last ptr to the first block_prt the subsequent execution of step 505, by the second processor's ATLB, will determine that the last_ptr and the cur_last (saved by the second processor) do not compare. In this case the second processor's ATLB takes the path 512 (false) and goes back to step 502 and again saves the first and last pointers. When the second processor's ATLB re-executes step 505 the last_ptr and the cur_ptr will compare and the second processor's ATLB will set the last_ptr equal to the second block_ptr and then proceed and execute steps 506 through 511 successfully. Concurrent ATLB functions executed, in this example of an embodiment of the present invention, on the same list by two or more processors has handled contention without the use of locks 3. Remove from the Front of a List (RFLF)

Obviously a data element can only be removed from a list that has data elements in it when a RFLF is requested. However, a list can be empty or in a transition to an empty list. Therefore a determination is made as to whether a list is empty. For embodiments of the present invention, data elements are removed only from the front of a list.

RTLF protocol:

Since the present second data element will become the first data element, the first pointer in the head is altered first.

Figure 4:
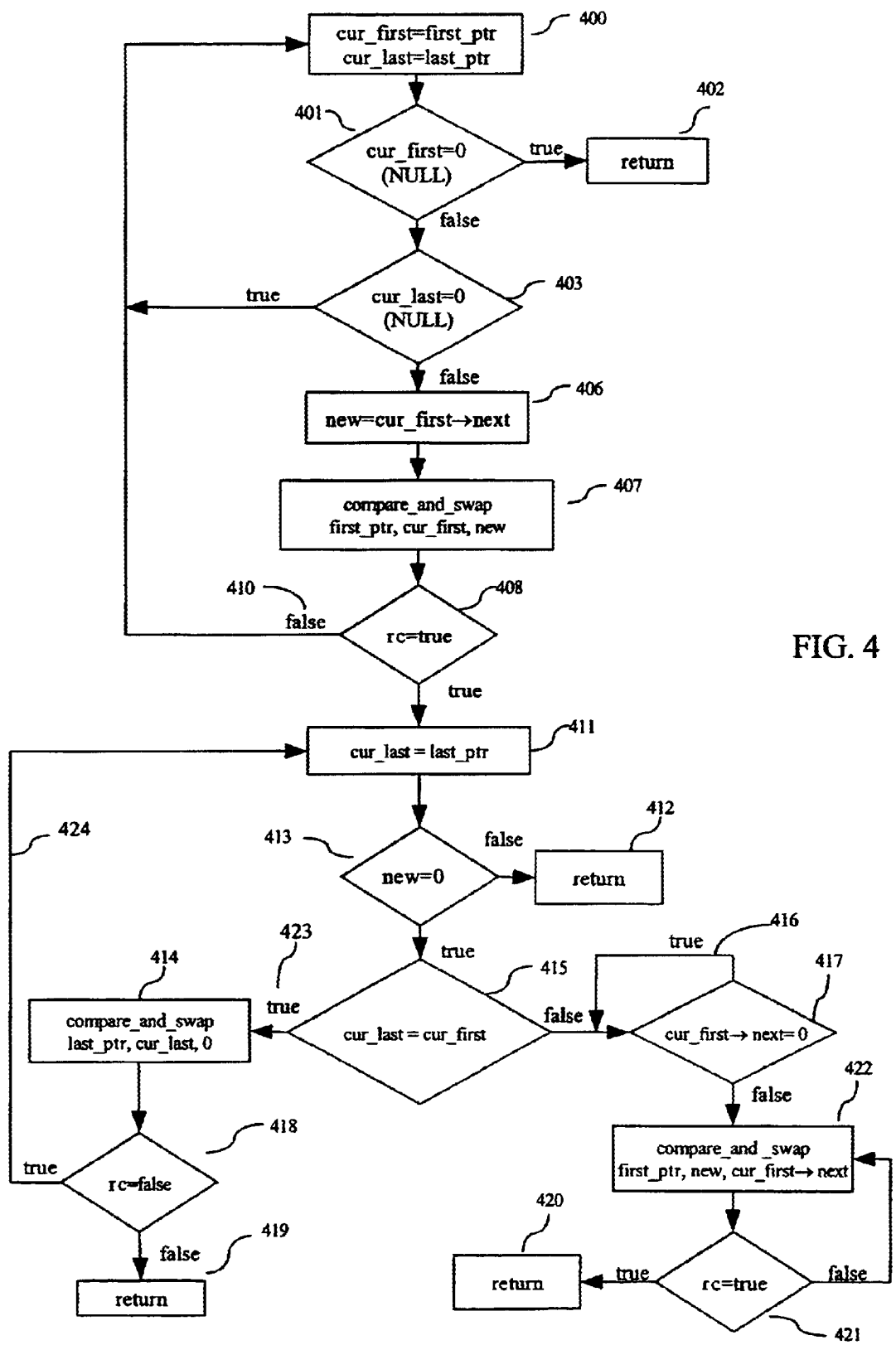
FIG. 4 is a flow diagram of a methodology to remove a data element from a list in one embodiment of the present invention.

The RFLF function is illustrated in the flow diagram of FIG. 4. In step 400 the first and last pointers are saved as cur_first and cur_last. A determination of whether the list is empty is done in step 401 by testing whether the cur_last is equal to NULL. If the list is empty, then a return is invoked in step 402. If the list is not empty, cur_last is tested in step 403 and if equal to NULL the list is in transition to an empty list and again a return is invoked via branch 404 to allow the transition to be completed. If the list has at least one data element, step 406 sets a variable "new" equal to the next pointer of the current first data element (data element with a pointer corresponding to cur first). In the CAS (first_ptr, cur_first, new) of step 407, the first_ptr and cur_first compare and the first _ptr is set equal to the variable "new" the next pointer of the current first data element) and flag "rc" is true causing a branch to step 411 where the last pointer is saved as cur_first. As a result of step 407, the _current first element is no longer pointed to and thus is removed from the list. In a RFLF, the last pointer need not change unless the data element removed is the only data element and the list has become an empty. Variable "new" was set equal to the next pointer of the current first data element in step 406. If the element that was removed was the only element in the list, it was also the last element and as such had a next pointer equal to NULL. If the list is now empty at step 413, the test of "new=0" NULL) will be true and the cur_first and cur_last will be tested in step 415. A false test of "new=0" will result in a return to step 412. Typically, when exiting step 413 to step 415, a data element has just been removed from a single data element list and the first and last pointers are the same. In this case, the first and last pointers were saved (as cur_first and cur_last respectively) in step 400 and thus step 415 will be true. A CAS is invoked in step 414 keep the pointers consistent by setting the last pointer equal to NULL for the now empty list. However another condition may occur in step 415. The list, which had just become empty, could have another processor adding an element to the back of the list with an ATLB. Another processor's ATLB would change the last pointer then exiting step 415 to step 414 and executing the CAS (last_ptr, cur_last, 0) would determine that the last_prt and the cur_last are not equal (rc=false) and thus branch 424 will be taken from 418 back to step 411 where cur_last is set equal to the last_ptr. Subsequently, in step 415, cur_last and cur_first are no longer equal and step 417 will be executed. Since the list was a single element list before an element was removed, the next pointer of the data element with the pointer equal to cur_first is NULL and a branch 416 wait occurs. The wait will continue until the ATLB function of the a contending processor changes the next pointer of the current first data element (the data element that was removed) to a value other than NULL. When step 417 returns a false condition, step 422 is then executed where a CAS (first_ptr, new, cur_first next) is invoked. "New" and first_ptr will compare and the CAS sets the first_ptr equal to the next pointer of the data element with pointer equal to cur_first (the data element just removed). The first_ptr is set to the pointer of the data element added to the back of the list by the ATLB function of the contending processor. The return flag "rc" will eventually become true causing a return in step 420. A false condition in step 421 just illustrates a waiting until the true condition is returned. The use of the functions ATLB and RFLF, of the present invention, demonstrate that concurrent adding to the back of a list and removing from the front of the same list is handled without the use of locks.

Invoking concurrent ATLF and RFLF functions does not cause contention. No contention occurs because the last pointer does not change in either function unless, the list is in transition to a NULL by the RFLF and correspondingly the ATLF, in adding to the front of the list, does not change the last pointer unless the list was NULL. If a list becomes NULL when the last element is removed by a RFLF, both the first and last pointers may not be NULL if the RFLF completed without contention. In this situation, step 604 illustrated in FIG. 6, will take branch 614 and will allow the RFLF to complete until both the first and last pointer of the now empty list are both NULL. When this occurs, the ATLF will execute step 605 and successfully add the element to the empty list.

Although having one processor invoke a RFLF on a list while a second processor concurrently invokes an ATLF is not one in which embodiments of the present invention anticipates as most useful, the contention is handled without locks.

Other contentions between two or more processors in accessing a list using the methods and functions of the present invention can be shown to be handled without the use of locks. Only those contentions that were important when managing a list with the protocol of LIFO, FIFO and combinations therein were explained in detail.

Figure 8:
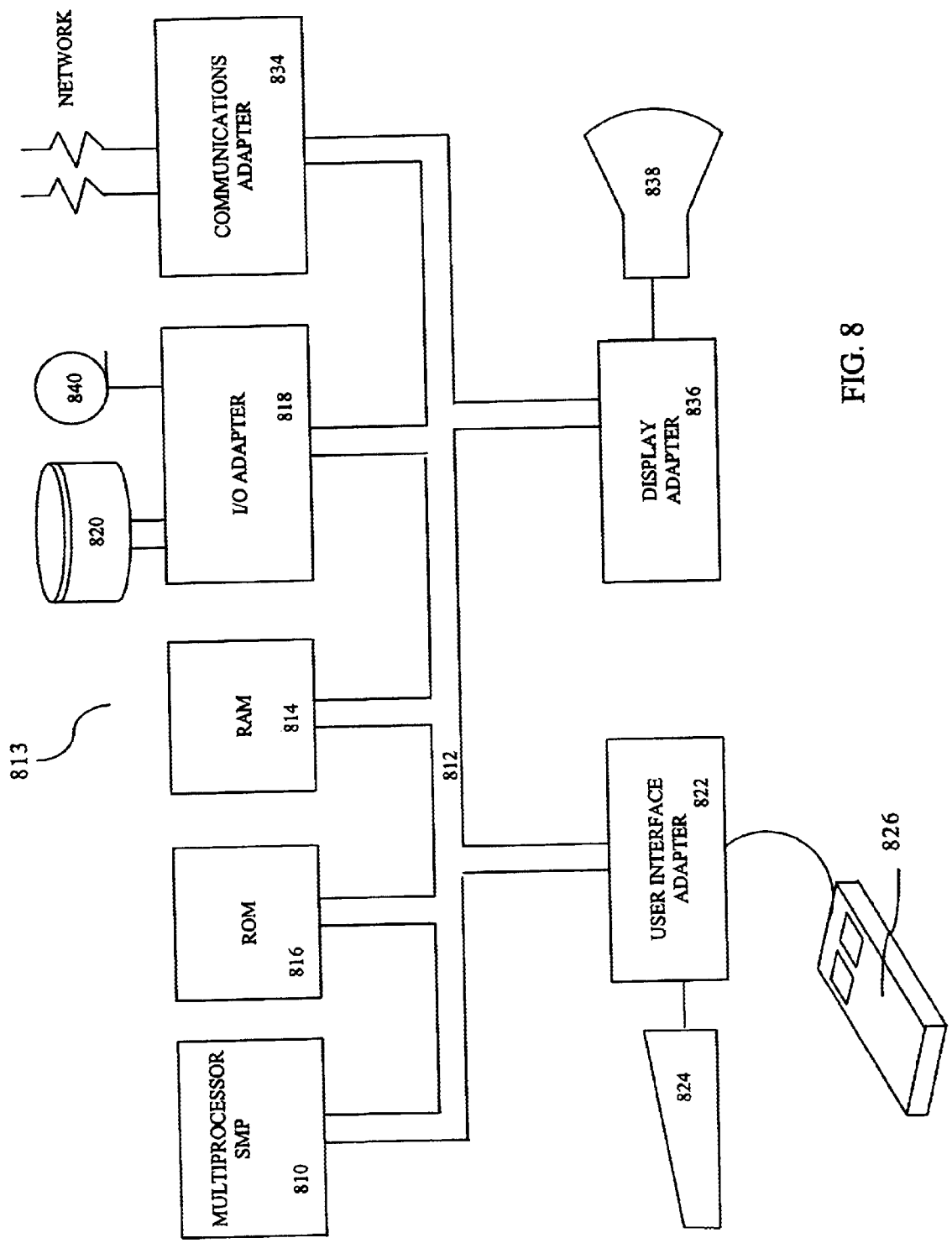
FIG. 8 is an illustration of a system employing embodiments of the present invention.

A representative hardware environment for practicing the present invention is depicted in FIG. 8, which illustrates a typical hardware configuration of data processing system 813 in accordance with the subject invention having a symmetrical multiprocessor central processing unit (SMP) 810, such as a multiplicity of conventional microprocessors, and a number of other units interconnected via system bus 812. Data processing system 813 includes random access memory (RAM) 814, read only memory (ROM) 816, and input/output (I/O) adapter 818 for connecting peripheral devices such as disk units 820 and tape drives 840 to bus 812, user interface adapter 822 for connecting keyboard 824, mouse 826, and/or other user interface devices such as a touch screen device (not shown) to bus 812, communication adapter 834 for connecting data processing system 813 to a data processing network, and display adapter 836 for connecting bus 812 to display device 838. SMP 810 may include other circuitry not shown herein, which will include circuitry commonly found within a processor or microprocessor (e.g., execution unit, bus interface unit, arithmetic logic unit, etc.). SMP 810 may also reside on a single integrated circuit. System 813 and primarily SMP 810 may contain any number of system units or software modules employing the method of list management as described herein.

Although the present invention and its advantages have been described in detail, it should be understood that various changes, substitutions and alterations can be made herein without departing from the spirit and scope of the invention as defined by the appended claims.

What is claimed is:

1. A method of managing a linear list of data elements in a multiprocessor (MP) system without the use of locks comprising the step of:

modifying said list, said step of modifying said list further comprising the steps:

selectively invoking a first function for adding a data element to said list, said first function including an atomic operation for manipulating pointers of said list; and selectively invoking a second function for removing a data element from said list, said second function including said atomic operation for manipulating pointers of said list, wherein said atomic operation comprises a compare and swap operation on parameters of said list and said compare and swap operation sets a flag bit said flag bit indicating decision paths taken within said compare and swap when executed, and wherein said parameters comprise a plurality of pointer values of said list said plurality of pointer values comprising, data element pointers; a first_ptr, last_ptr, a next_ptr, a block_ptr, a cur_first pointer, and a cur_last pointer, and whereby contention for access to said list is managed without locks if each of a multiplicity of processors of said MP system invoke concurrently a corresponding one of said first function or said second function.

2. The method of claim 1, wherein said second function removes data elements from the front of said list.

3. The method of claim 1, wherein said first function comprises a third function for adding a data element to the front of said list and a fourth function for adding a data element to the back of said list.

4. The method of claim 3, wherein said third function further comprises the steps of:

testing if said list is an empty list;

testing a returned flag from said atomic operation;

saving pointers of said list; and testing the values of pointers of said list.

5. The method of claim 3, wherein said fourth function further comprises the steps of:

testing if said list is an empty list;

testing a returned flag from said atomic operation;

saving pointers of said list; and testing the values of pointers of said list.

6. A data processing system, comprising:

a multiprocessor (MP) central processing unit (CPU);

shared random access memory (RAM);

read only memory (ROM);

an I/O adapter; and a bus system coupling said CPU to said ROM, said RAM and said I/O adapter, wherein said CPU further comprises:

a system for managing a list of data elements, said list residing in a block of said shared memory in RAM of said MP, comprising:
   a first circuit operable for selectively adding a data element to said list, said first circuit including an atomic circuit operable for manipulating addresses pointers of said list; and
   a second circuit operable for selectively removing a data element from said list, said second circuit including said atomic circuit operable for manipulating addresses pointers of said list,
   wherein said atomic operation comprises a compare and swap operation on parameters of said list and said compare and swap operation sets a flag bit said flag bit indicating decision paths taken within said compare and swap when executed,
   wherein said parameters comprise a plurality of pointer values of said list said plurality of pointer values comprising, data element pointers; a first_ptr, last_ptr, a next_ptr, a block_ptr, a cur_first pointer, and a cur_last pointer, and
   wherein contention for access to said list is managed without locks if a least two processors of a multiplicity of processors of said MP system concurrently add a first data element to and remove a second data element from said list of data elements.

7. The data processing system of claim 6, wherein said second circuit is operable to removes data elements from the front of said list.

8. The data processing system of claim 6, wherein said first circuit comprises a third circuit operable for adding a data element to the front of said list and a fourth circuit operable for adding a data element to the back of said list.

9. The data processing system of claim 8, wherein said third circuit comprises:
   a test circuit for testing if said list is an empty list;
   a flag compare circuit for testing a returned flag from said atomic circuit operation;
   a storage circuit for storing address pointers of said list; and
   a pointer compare circuit for comparing the values of address pointers of said list.

10. The data processing system of claim 8, wherein said fourth circuit comprises:
   a test circuit for testing if said list is an empty list;
   a flag compare circuit for testing a returned flag from said atomic circuit operation;
   a storage circuit for storing address pointers of said list; and
   a pointer compare circuit for comparing the values of address pointers of said list.

11. A computer program product embodied in a machine readable medium, including programming for a symmetrical multiprocessor system with shared memory, comprising a program of instructions for performing the method steps of:
   modifying said list, said step of modifying said list further comprising the steps:
      selectively invoking a first function for adding a data element to said list, said first function including an atomic operation for manipulating pointers of said list; and
      selectively invoking a second function for removing a data element from said list, said second function including said atomic operation for manipulating pointers of said list,
   wherein said atomic operation comprises a compare and swap operation on parameters of said list and said compare and swap operation sets a flag bit said flag bit indicating decision paths taken within said compare and swap when executed,
   wherein said parameters comprise a plurality of pointer values of said list said plurality of pointer values comprising, data element pointers; a first_ptr, last_ptr, a next_ptr, a block_ptr, a cur_first pointer, and a cur_last pointer, and
   whereby contention for access to said list is managed without locks if each of a multiplicity of processors of said MP system invoke concurrently a corresponding one of said first function or said second function.

12. The computer program product of claim 11, wherein said second function removes data elements from the front of said list.

13. The computer program product of claim 11, wherein said first function comprises a third function for adding a data element to the front of said list and a fourth function for adding a data element to the back of said list.

14. The computer program product of claim 13, wherein said third function further comprises the steps of:
   testing if said list is an empty list;
   testing a returned flag from said atomic operation;
   saving pointers of said list; and
   testing the values of pointers of said list.

15. The computer program product of claim 13, wherein said fourth function further comprises the steps of:
   testing if said list is an empty list;
   testing a returned flag from said atomic operation;
   saving pointers of said list; and
   testing the values of pointers of said list.

16. A system of managing a list of data elements, said list residing in a block of shared memory in a multiprocessor (MP) system comprising:
   a first circuit operable for selectively adding a data element to said list, said first circuit including an atomic circuit operable for manipulating addresses pointers of said list; and
   a second circuit operable for selectively removing a data element from said list, said second circuit including said atomic circuit operable for manipulating addresses pointers of said list,
   wherein said atomic operation comprises a compare and swap operation on parameters of said list and said compare and swap operation sets a flag bit said flag bit indicating decision paths taken within said compare and swap when executed,
   wherein said parameters comprise a plurality of pointer values of said list said plurality of pointer values comprising, data element pointers; a first_ptr, last_ptr, a next_ptr, a block_ptr, a cur_first pointer, and a cur_last pointer, and
   wherein contention for access to said list is managed without locks if a least two processors of a multiplicity of processors of said MP system concurrently add a first data element to and remove a second data element from said list of data elements.

17. The system of claim 16, wherein said second circuit is operable to remove data elements from the front of said list.

18. The system of claim 16, wherein said first circuit comprises a third circuit for adding a data element to the front of said list and a fourth circuit for adding a data element to the back of said list.

19. The system of claim 18, wherein said third circuit further comprises:
- a test circuit for testing if said list is an empty list;
- a flag compare circuit for testing a returned flag from said atomic circuit operation;
- a storage circuit for storing address pointers of said list; and
- a pointer compare circuit for comparing the values of address pointers of said list.

20. The system of claim 18, wherein said fourth circuit further comprises:
- a test circuit for testing if said list is an empty list;
- a flag compare circuit for testing a returned flag from said atomic circuit operation;
- a storage circuit for storing address pointers of said list; and
- a pointer compare circuit for comparing the values of address pointers of said list.

* * * * *

UNITED STATES PATENT AND TRADEMARK OFFICE
CERTIFICATE OF CORRECTION

PATENT NO.     : 6,651,146 B1
DATED          : November 18, 2003
INVENTOR(S)    : Mysore Sathyanarayana Srinivas, James William VanFleet and David Blair Whitworth It is certified that error appears in the above-identified patent and that said Letters Patent is hereby corrected as shown below:

Column 14,
Line 34, following "pointers" please replace ":" with -- , --.

Column 15,
Line 19, following "pointers" please replace ":" with -- , --.

Column 16,
Line 53, following "pointers" please replace ":" with -- , --.

Signed and Sealed this

Twenty-seventh Day of July, 2004

JON W. DUDAS
*Acting Director of the United States Patent and Trademark Office*